J. FIELDS.
NUT LOCK.
APPLICATION FILED APR. 23, 1921.
1,403,902.
Patented Jan. 17, 1922.
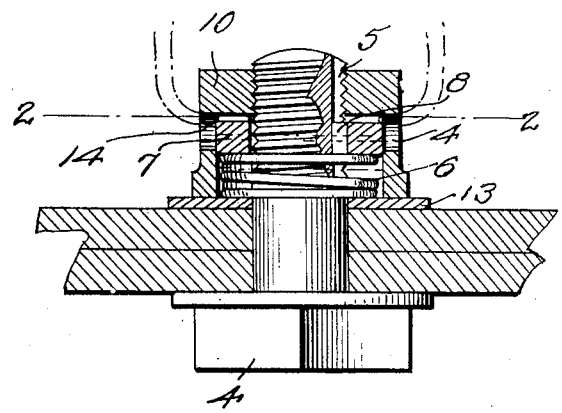
Fig. 1.
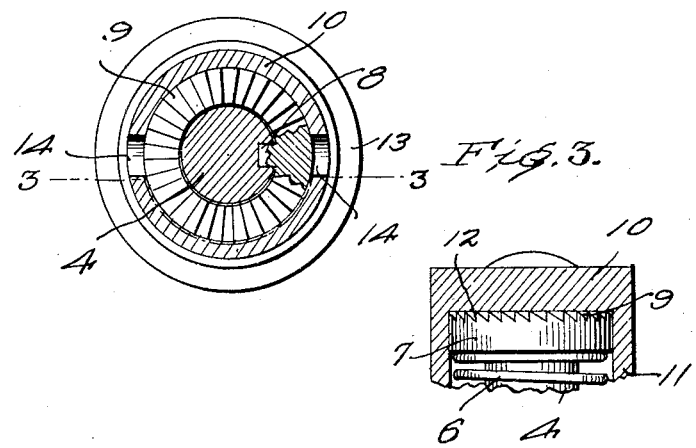
Fig. 2.
Fig. 3.
Witness
J. F. McArthur
B. F. Garvey
Inventor
Joe Fields
By Richard B. Owen
Attorney

UNITED STATES PATENT OFFICE.

JOE FIELDS, OF CLENDENIN, WEST VIRGINIA.

NUT LOCK.

1,403,902.  Specification of Letters Patent.  Patented Jan. 17, 1922.

Application filed April 23, 1921. Serial No. 463,779.

*To all whom it may concern:*

Be it known that I, JOE FIELDS, a citizen of the United States, residing at Clendenin, in the county of Kanawha and State of West Virginia, have invented certain new and useful Improvements in Nut Locks, of which the following is a specification.

This invention relates to nut locks designed to prevent casual displacement of the nut but permitting expeditious removal when desired.

An object of the invention is to provide a washer which coacts with the nut to hold the latter anchored on the bolt thereby preventing rotation of the nut although separation of the latter from the washer permits removal of the nut in the usual way.

The above and other objects of this invention will be in part described and in part understood from the following description of the present preferred embodiment of the invention taken in connection with the accompanying drawings, wherein:

Fig. 1, is a fragmentary longitudinal sectional view of a nut lock constructed in accordance with this invention illustrating its application.

Fig. 2, is a sectional view taken on the line 2—2 of Fig. 1, and

Fig. 3, is a fragmentary sectional view taken on the line 3—3 of Fig. 2.

In the drawings a bolt 4 is provided the shank of which has screw threads formed thereon. A longitudinal slot 5 is formed in the bolt and preferably extends the entire length of the screw threads.

The nut lock consists especially of a coil spring 6 which is convoluted on the shank of the nut and has superimposed thereon a washer 7, the latter being provided with a lug 8 which is slidably mounted in the groove 5. The outer face of the washer is provided with ratchet teeth 9 as shown to advantage in Figs. 2 and 3. Superimposed on the washer 7 is a nut 10 which has depending from its inner face and integrally formed therewith a skirt 11 which encases the washer 7 and spring 6. The nut is provided with a screw threaded bore which engages the threads on the shank of the bolt 4 in the usual way. The inner face of the nut is provided with ratchet teeth 12, which complement the teeth 9 of the washer and cooperate therewith.

In use of this invention the bolt is first passed through the object to be secured following which a washer such as that indicated at 13 is passed over the bolt and engaged with the object. The spring 6 is then advanced on the bolt until its inner convolution contacts with the washer 13. Following this the washer 7 is placed on the bolt and engaged with the outer convolution of the spring 6. The nut 10 is then threaded on the bolt until the inner terminal of the skirt portion 11 is tightly engaged with the washer 13. When in this position the spring 6 is in a contracted position so as to exert its force against the washer 7 causing the latter to be engaged with the nut 10. Since the teeth 9 of the washer and 12 of the nut complement each other, movement of the nut in one direction will be permitted, but movement in the opposite direction prevented, as will be obvious upon reference to Fig. 3. However, when it is desired to disengage the nut a suitable instrument may be used to separate the washer from the nut. This is preferably done by forming apertures 14 in the walls of the nut through which the instrument may pass as shown in Fig. 1. By pressing in on the instrument the washer will be flexed downwardly to disengage its teeth from the teeth of the nut, and movement of the latter thereby permitted.

What is claimed is:

A nut lock including a bolt, a nut threaded on the bolt and having its inner face recessed and equipped with teeth, a washer slidably mounted on the bolt, one face of which is formed to provide teeth for engagement with the teeth of the nut and a spring to hold the washer engaged with the nut and adapted to be compressed completely within the nut recess when the nut is threaded against the work, said nut having lateral openings formed therein for the reception of means to separate the nut and washer for permitting removal of the nut.

In testimony whereof I have affixed my signature in presence of two witnesses.

JOE FIELDS.

Witnesses:
C. F. MOORE,
SARAH FIELDS.